(12) United States Patent
Picozza et al.

(10) Patent No.: US 10,863,847 B2
(45) Date of Patent: Dec. 15, 2020

(54) FOOD PREPARATION APPLIANCE WITH CLEANING FEATURE (71) Applicant: SUNBEAM PRODUCTS, INC., Boca Raton, FL (US)

(72) Inventors: Augusto A. Picozza, Boca Raton, FL (US); Cisco Arrieta, Weston, FL (US); Traci Licht, Boynton Beach, FL (US); George T. Hardin, Jr., Hattiesburg, MS (US)

(73) Assignee: Sunbeam Products, Inc., Boca Raton, FL (US)

( * ) Notice: Subject to any disclaimer, the term of this patent is extended or adjusted under 35 U.S.C. 154(b) by 473 days.

(21) Appl. No.: 15/518,835

(22) PCT Filed: Oct. 14, 2015

(86) PCT No.: PCT/US2015/055541
§ 371 (c)(1),
(2) Date: Apr. 13, 2017

(87) PCT Pub. No.: WO2016/061234
PCT Pub. Date: Apr. 21, 2016

(65) Prior Publication Data
US 2017/0258256 A1 Sep. 14, 2017

Related U.S. Application Data (60) Provisional application No. 62/063,844, filed on Oct. 14, 2014.

(51) Int. Cl.
*A47J 19/02* (2006.01)

(52) U.S. Cl.
CPC .................. *A47J 19/027* (2013.01)

(58) Field of Classification Search
CPC .................. A23N 1/00–1/02; A23L 2/04–2/06
See application file for complete search history.

(56) References Cited

U.S. PATENT DOCUMENTS

| 1,953,714 A | 4/1934 | Jenkins |
| 2,289,656 A | 7/1942 | Knapp |

(Continued)

FOREIGN PATENT DOCUMENTS

| CN | 2552355 Y | 5/2003 |
| EP | 0980664 | 2/2000 |

(Continued)

OTHER PUBLICATIONS

International Search Report dated Feb. 5, 2016 in PCT/US2015/055541, 2 pages.

(Continued)

*Primary Examiner* — Ibrahime A Abraham
*Assistant Examiner* — Elizabeth M Sims
(74) *Attorney, Agent, or Firm* — Husch Blackwell LLP (57) ABSTRACT

A food preparation appliance comprising a sieve having an inner perforated surface for extracting a food item into liquid and solid particles, a source of rotatable power for rotating the sieve, a cleaning device for removing unwanted buildup of pulp from the perforated surface of the sieve, and a reservoir holding a pre-determined volume of cleaning fluid that is released and directed onto the sieve when the cleaning device is operated.

10 Claims, 10 Drawing Sheets

(56) References Cited

U.S. PATENT DOCUMENTS

| | | |
|---|---|---|
| 2,440,425 A | 4/1948 | Williams |
| 2,481,010 A | 9/1949 | Gundelfinger |
| 3,186,458 A | 6/1965 | Hisao |
| 4,250,771 A | 2/1981 | Berler |
| 4,485,732 A * | 12/1984 | Goudard .................. A23N 4/08 |
| | | 426/485 |
| 5,544,572 A | 8/1996 | Garmendia |
| D375,024 S | 10/1996 | Pursley |
| 5,924,357 A | 7/1999 | Chen |
| 6,595,121 B1 | 7/2003 | Chang |
| 7,000,534 B1 | 2/2006 | Mendes |
| 7,337,715 B2 | 3/2008 | Suter et al. |
| 7,587,974 B2 * | 9/2009 | Cohen .................. A47J 19/027 |
| | | 426/231 |
| 8,146,490 B2 | 4/2012 | Obersteiner et al. |
| D667,703 S | 9/2012 | Ramirez |
| 8,277,666 B2 | 10/2012 | Sturgess |
| 8,387,520 B2 | 3/2013 | Backus |
| D698,210 S | 1/2014 | Lavy et al. |
| 8,899,147 B2 | 12/2014 | Dille |
| 2008/0314261 A1 | 12/2008 | Hensel |
| 2009/0235831 A1 | 9/2009 | Nisonov |
| 2010/0050886 A1 * | 3/2010 | Obersteiner .......... A47J 19/027 |
| | | 99/507 |
| 2011/0083566 A1 | 4/2011 | Backus |
| 2014/0261019 A1 | 9/2014 | Conti et al. |
| 2014/0290503 A1 * | 10/2014 | Bae ....................... A47J 19/027 |
| | | 99/513 |

FOREIGN PATENT DOCUMENTS

| | | |
|---|---|---|
| EP | 1656056 | 1/2007 |
| WO | 2009077933 A2 | 6/2009 |
| WO | 2009077933 A3 | 6/2009 |
| WO | 2013044697 A1 | 4/2013 |

OTHER PUBLICATIONS

Philips, Avance Collection Juicer, HR1874/74, www.mea.philips.com/c-p/HR1874_74/avance-collection-juicer, Sep. 7, 2015, 7 pages.

KitchenAid, Easy Clean Juicer (fast juicer), KVJ0333OB, www.kitchenaid.com/shop/-%5BKVJ0333OB%5D-407400/KVJ0333OB/, Jul. 19, 2015, 2 pages.

Kitchenboy, Fagor Healthy Squeeze Slow Juicer, Feb. 14, 2013, kitchenboy.net/blog/fagor-new-for-2012/, Feb. 14, 2013, 5 pages.

JB—Juicers-Best, Omega VERT HD VRT350 Juicer Reviews, juicers-best.com/blogs/juicers-best-reviews/7253596-omega-vert-hd-vrt350-juicer-reviews, Jan. 28, 2013, 3 pages.

* cited by examiner

FOOD PREPARATION APPLIANCE WITH CLEANING FEATURE

CROSS-REFERENCE TO RELATED APPLICATION

The present application claims benefit of U.S. Provisional Patent Application No. 62/063,844 filed Oct. 14, 2014, entitled "Juice Extractor Auto-Dispense for Cleaning Function".

FIELD OF THE INVENTION

The invention relates to food preparation appliances. More particularly, the invention relates to an improved food preparation appliance with a cleaning feature including dispensing of a cleaning fluid for removing excessive buildup of food pulp from a rotating sieve that shreds items such as fruits and vegetables and extracts juice.

BACKGROUND OF THE INVENTION

Appliances for preparing food are well known, and in particular, juicing appliances for preparing juice from fruits and vegetables. Typically, these appliance use a shredding implement such as a perforated disc to shred the fruits and vegetables and a filter screen to extract liquid from the solid food particles. An unfortunate consequence of shredding fruits and vegetables with such a shredding implement is that unwanted pulp builds up on the working surface of the shredding implement. This unwanted buildup of pulp needs to be periodically removed or the juicing efficiency is seriously reduced. Many of these juicing appliances use a cleaning implement to periodically scrape the pulp from the shredding implement. One drawback of these cleaning implements is that irregularities on the working surface of the shredding implement cause the cleaning implement to be unevenly applied against the surface of the shredding implement as it is rotated reducing cleaning efficiency. In addition, the cleaning implement may not completely remove unwanted pulp from the shredding implement.

SUMMARY OF THE INVENTION

In an embodiment, there is provided an appliance including a sieve having an inner perforated surface for extracting a food item into liquid and solid particles, a source of rotatable power for rotating the sieve, a cleaning device for removing unwanted buildup of pulp from the perforated surface of the sieve, and a reservoir holding a pre-determined volume of cleaning fluid that is released and directed onto the sieve when the cleaning device is operated.

In an embodiment, there is provided a food preparation appliance including a sieve having an inner perforated surface for extracting a food item into liquid and solid particles, a source of rotatable power for rotating the sieve, a manually operated cleaning device for removing unwanted buildup of pulp from the perforated surface of the sieve, and a reservoir holding a pre-determined volume of cleaning fluid that is released and directed onto the sieve when the cleaning device is operated.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
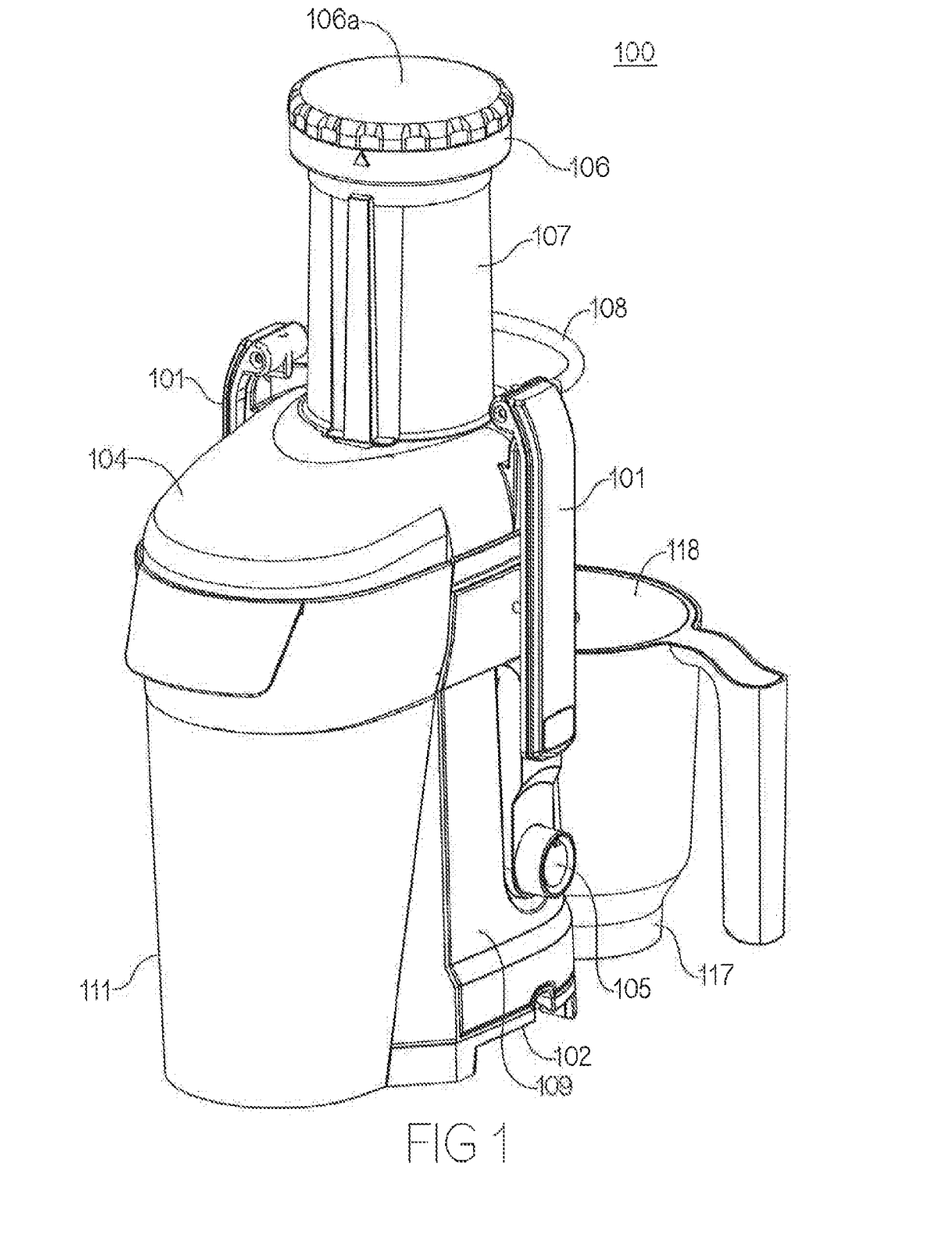
FIG. 1 is a perspective view of a juicing appliance with a cleaning feature.
Figure 2:
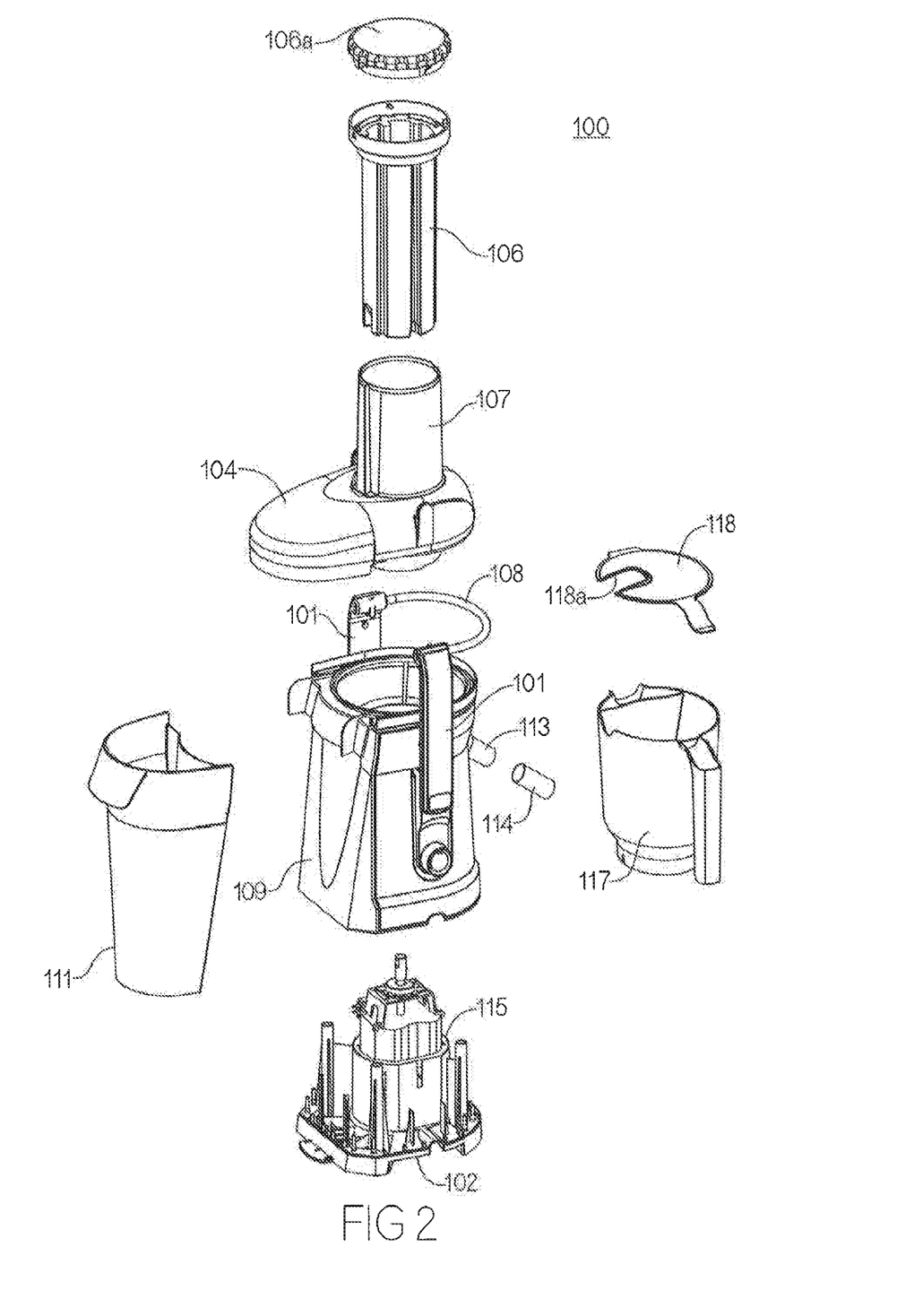
FIG. 2 is an exploded view of the juicing appliance of FIG. 1.

Referring now to FIGS. 1 and 2 of the drawings, in an embodiment there is illustrated a food preparation appliance 100 for preparing food such as juice from fruits and vegetables. The appliance 100 includes a base 102, housing 109, lid 104 with a cylindrical feed tube 107 extending upwardly therefrom, pulp container 111 removably attached to the front of the housing 109, a juice jug 117 fitted with a lid 118 removably attached to the rear of the housing 109, and a cylindrical food pusher 106 that is inserted into the feed tube 107. A cap 106a covers the open end of the cylindrical food pusher 106. A pair of locking arms 101 on opposite sides of the housing 109 secure the lid 104 to the housing 109. A control knob 105 disposed on one side of the housing 109 controls the operative electronic components including an electric motor 115 (FIG. 3) disposed within the housing 109. The control knob 105 may include variable settings such as off, low, medium, high, variable speed range, or any other combination speed setting. Alternately, the electric motor 115 may be controlled by a microprocessor (not shown) pre-programmed with juicing routines connected to the control knob 105.

In an embodiment, a juice spout 113 extends from the rear of the housing 109 and delivers juice to the juice jug 117 through a cutout 118a and the juice jug lid 118. A pivoting bail 108 is connected to the housing 109 for transporting the appliance 100.

Figure 3:
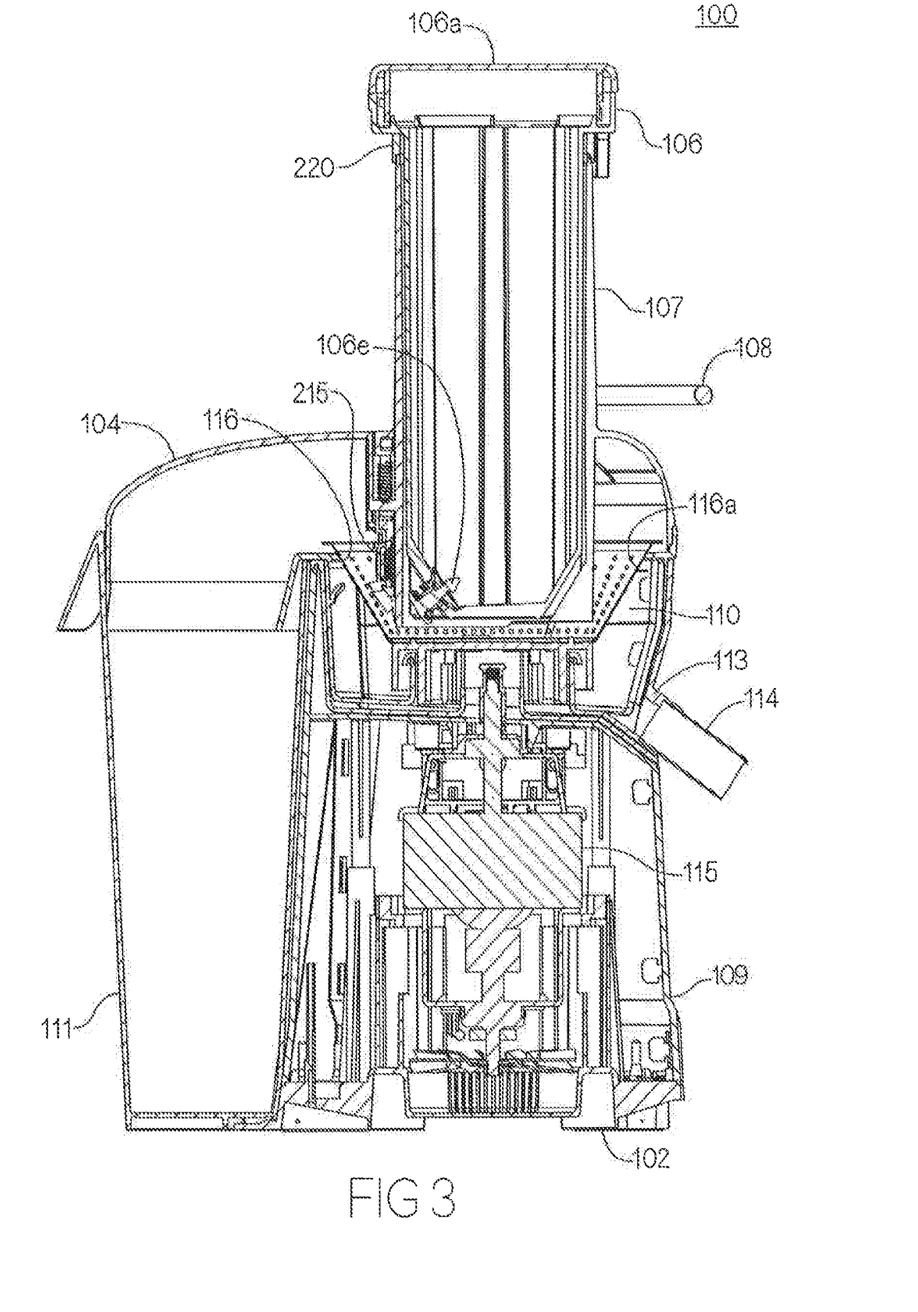
FIG. 3 is a cross-sectional view of the juicing appliance of FIG. 1 with the food pusher in the normal configuration for juicing operations.
Figure 4:
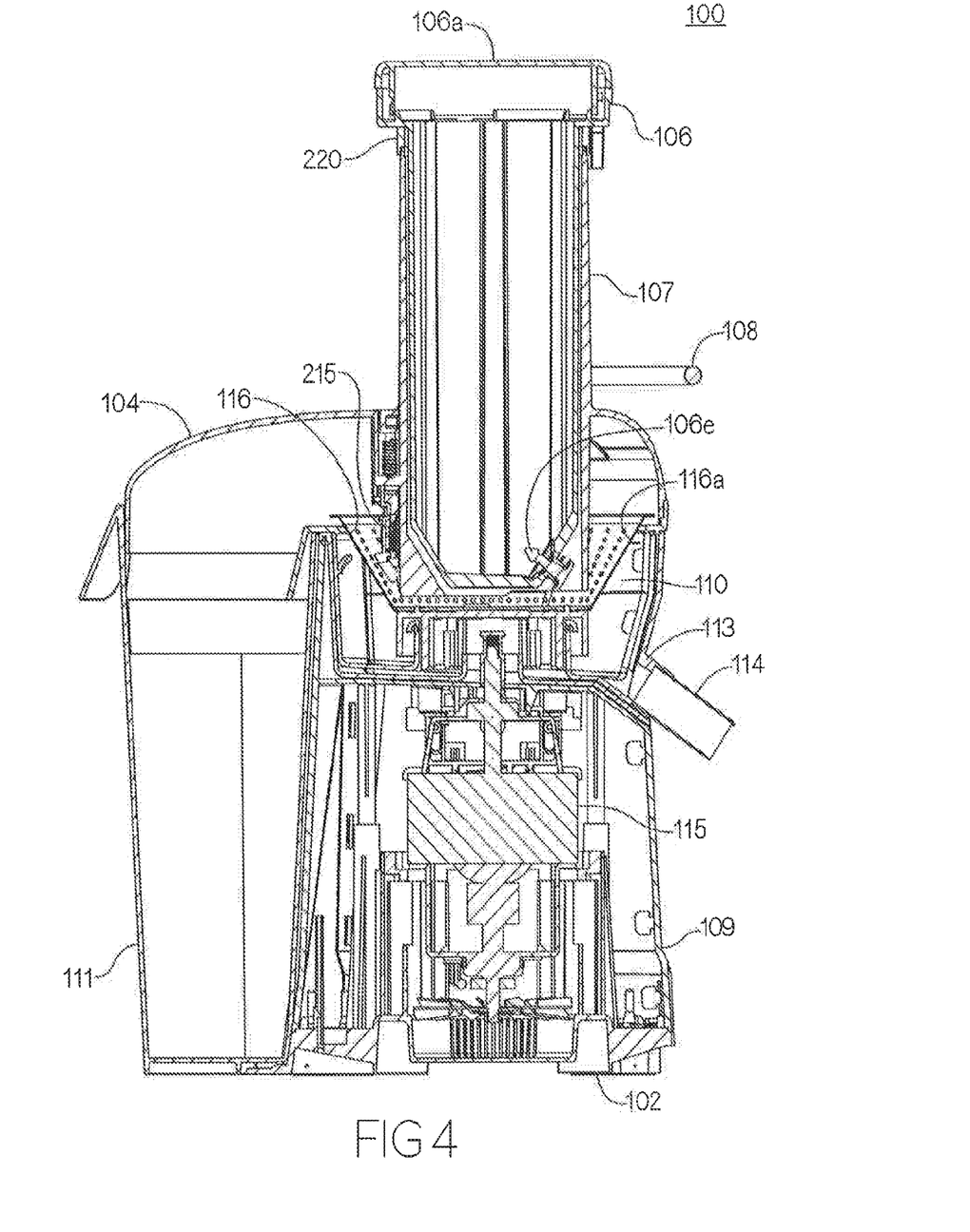
FIG. 4 is a cross-sectional view of the juicing appliance of FIG. 1 with the food pusher in a rotated one-hundred degree position for cleaning operations.

Referring now to FIGS. 3 and 4, there are illustrated cross-sectional views of the appliance 100. A frusto-conical shaped sieve 116 is disposed in the housing 109 above the electric motor assembly 115 that is rotatably coupled to the sieve 116. The sieve 116 may be made of any suitable material including but not limited to stainless steel and includes a perforated surface 116a (best seen in FIG. 5) for extracting fruit and vegetables urged against it. The perforated surface 116a is comprised of multiple perforations having sharp edges. When energized with electrical power via the rotating knob 105, the electric motor assembly 115 rotates the sieve 116 about its axis of rotation to urge by centrifugal action the fruits or vegetables fed into the sieve 116 via the feed tube 107 against the perforated surface 116a and perforations. The food pusher 106 is removed and replaced into the feed tube 107 after the fruits and vegetables are fed into the sieve 116. The fruits and vegetables are urged against the perforated surface 116a by centrifugal action as the sieve 116 rotates. The food pusher 106 may be depressed to improve the extraction process by further urging the fruits and vegetables into the perforated surface 116a of the sieve 116 as it is being rotated.

The sieve 116 in the assembled configuration is inserted into a recess 110 within the housing 109. The recess 110 is fluidly connected to the juice spout 113 that has an open end that drains into the juice jug 117 disposed at the rear of the housing 109. The spout 113 may have an elbow 114 at the free end for directing the juice into the juice jug 117. The elbow is rotatably coupled to the juice spout 113 and when rotated upward acts as a valve preventing juice from flowing out of the juice spout 113. The recess 110 collects juice that drains from within the sieve 116 through the perforated surface 116a as the fruits and vegetables are extracted into liquid and small solid particles. The small solid particles are prevented from entering the recess 110 because they are too large to pass through the perforations in the perforated surface 116a. As the volume of solid particles that are retained in the sieve 116 as the fruits and vegetables are extracted increases to the point they overflow the lip of the sieve 116, the overflow of solid particles are directed by centrifugal action into a pulp container 111 attached to the front of the housing 109. The pulp container 111 may be removed for emptying and cleaning as needed. A cleaning feature 215 is disposed within the housing 109 against the feed tube 106 for removing excess buildup of solid food particles on the perforated surface 116a. The operation of the cleaning feature 215 is described further hereinbelow.

Figure 5:
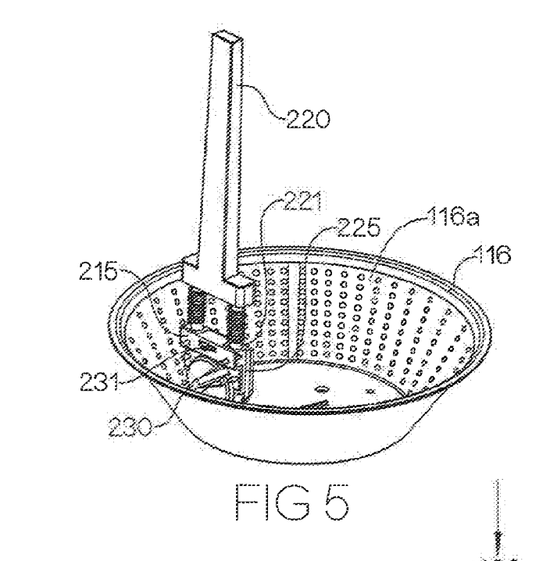
FIG. 5 is a perspective view of the sieve and cleaning feature assembly of the juicing appliance of FIG. 1.
Figure 6:
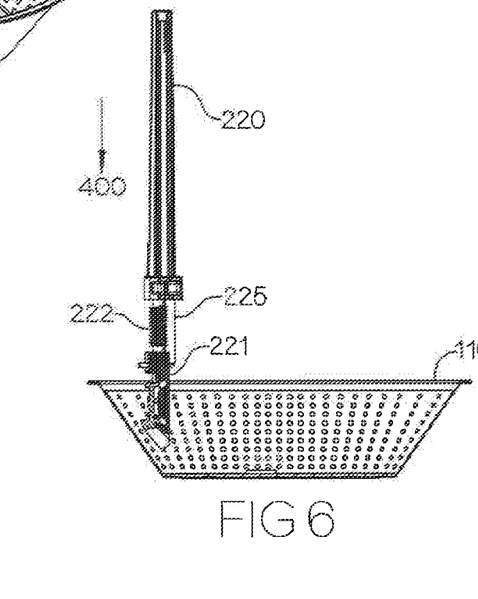
FIG. 6 is a cross-sectional side view of the cleaning feature assembly shown in FIG. 5. shown in an engaged position adjacent an inner perforated surface of the sieve of the juicing appliance of FIG. 1.

Referring now also to FIGS. 5 and 6, as the sieve 116 is rotated during operation there is a buildup of solid particles within sieve 116 as described above. Fruits and vegetables are extracted as they are urged by centrifugal action against the perforated surface 116a and the unwanted pulp residue begins to build up on the perforated surface 116a reducing juicing efficiency and drainage of juice from the sieve 116 into the recess 110. As a result, this unwanted pulp buildup must be periodically removed from the perforated surface 116a during the juicing operation. In an embodiment, the cleaning feature assembly 215 is provided including a resilient wiper blade 230 that engages the perforated surface 116a as the sieve 116 is rotated to remove the buildup of unwanted pulp from the perforated surface 116a. When it is desired to perform a cleaning operation of the sieve 116, a user depresses the cap 106a at the top of the cylindrical food pusher 106 which engages and depresses a slender actuating member 220 of the cleaning feature assembly 215. The actuating member 220 is also disposed on the outer side of the lid feed tube 107.

When the actuating member 220 is depressed in the direction of arrow 400, a pair of posts 221 extending downwardly from the actuating member 220 urge a wiper blade assembly 225 downward into the sieve 116 and against the perforated surface 116a. Normally, the wiper blade assembly 225 is biased into a retracted position by a pair of springs 222 disposed around the posts 221 and does not contact the perforated surface 116a. A wiper blade 230 is mounted on and extends outwardly from the wiper blade assembly 225 such that when the actuating member 220 is depressed, the outer edge of the wiper blade 230 engages the perforated surface 116a of the sieve 116. The wiper blade 230 disengages the buildup of pulp as the sieve 116 rotates. The wiper blade 230 is set at an optimal angle against the perforated surface 116a for cleaning and removing pulp from the sieve 116. The wiper blade 230 is comprised of a resilient material such as polytetrafluoroethylene, plastic, metal or any other suitable material. The operation of the cleaning feature assembly 215 is described below.

Figure 7:
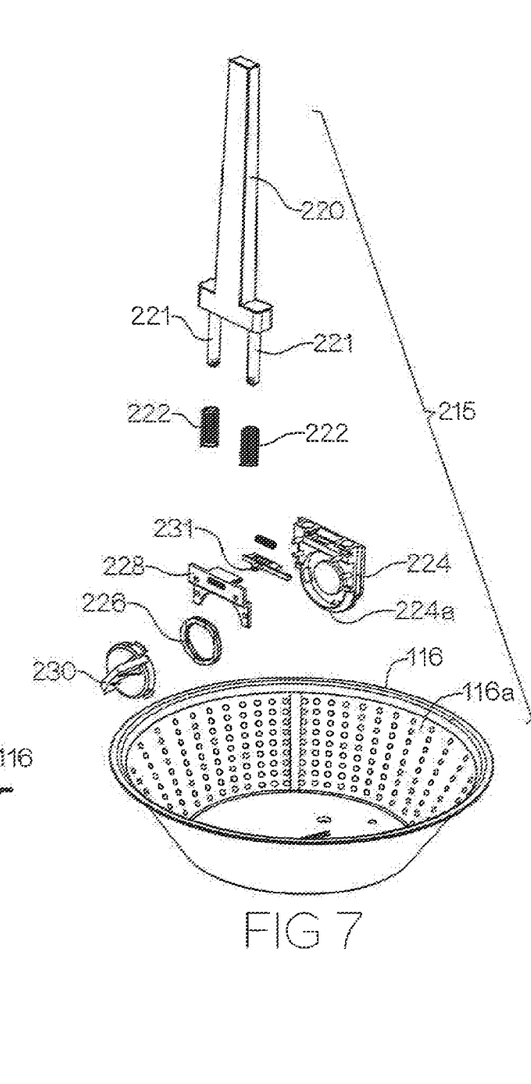
FIG. 7 is an exploded view of the cleaning feature assembly shown in FIG. 5.
Figure 8:
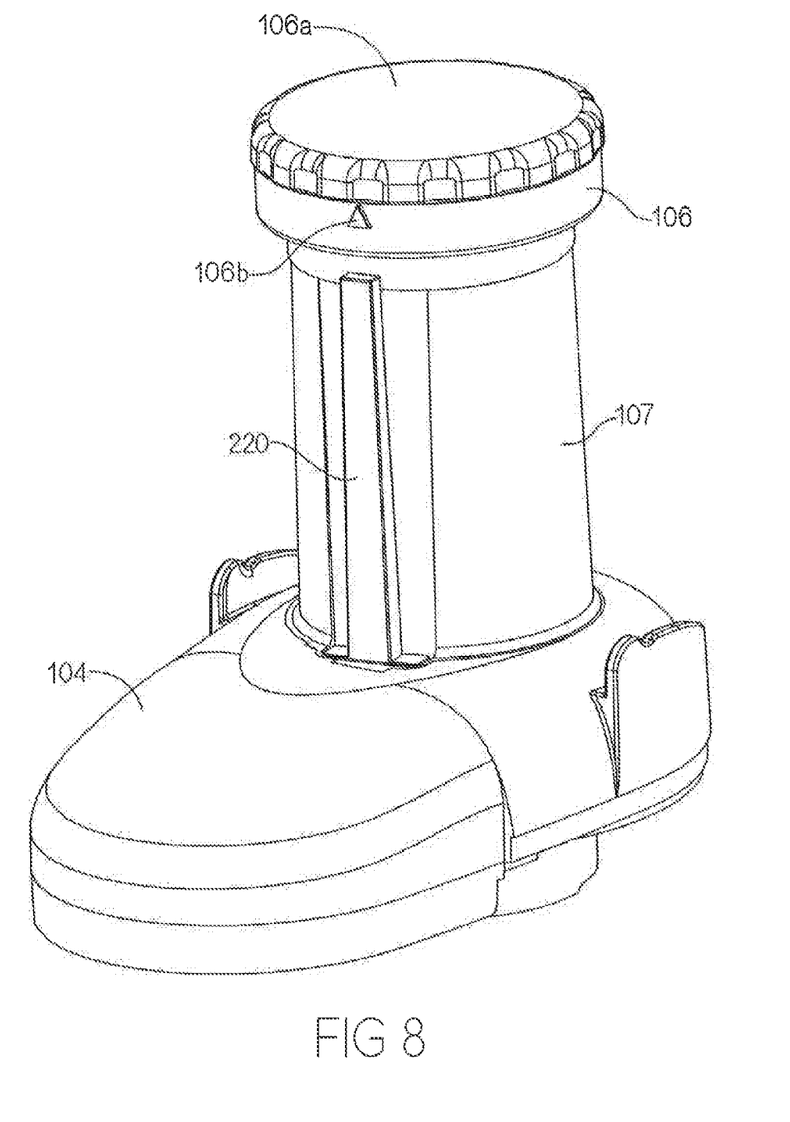
FIG. 8 is an enlarged perspective view of the lid and feed tube of the juicing appliance of FIG. 1.

Referring now also to FIG. 7, there is illustrated an exploded view of an embodiment of the cleaning feature assembly 215. The wiper blade 230 is mounted on a mounting assembly 224. The pair of posts 221 fit into apertures formed in the top of the mounting assembly 224. The pair of posts 221 are locked and released into the apertures by a sliding lock 231 that fits into the mounting assembly 224. An annular coil wave spring 226 is mounted in a recess 224a formed in the mounting assembly 224. A mounting bracket 228 secures the wiper blade 230 against the coil wave spring 226 in the recess 224a. A pair of screws affix the bracket 228 against the mounting assembly 224. The coil wave spring 226 is resilient and biases the wiper blade 230 against the perforated surface 116a but allows the wiper blade 230 to elastically return slightly back into the recess 224a when the wiper blade 230 encounters imperfections in the perforated surface 116a as the sieve 116 rotates. As such, the wave spring 226 causes the wiper blade 230 to apply constant pressure against the perforated surface 116a when the actuating member 220 is depressed by depressing the food pusher 106 despite irregularities in the perforated surface 116a and the imperfections in the roundness of the sieve 116 as the sieve 116 is rotated.

A coil wave spring 226 was selected because of their smaller size in the axial direction as compared to conventional coil springs. In addition, the use of the coil wave spring 226 allows the wiper blade 230 to remain more fully engaged with the perforated surface 116a when irregularities are encountered on the perforated surface 116a as the sieve 116 is rotated. This is because the biasing forces from the coil wave spring 226 are distributed at multiple points on the wiper blade 230 as compared to a being applied at a single point with more conventional coils springs. Still, a conventional coil spring (not shown) may be used although with less effectiveness.

Referring now to FIGS. 8-11, there is illustrated various views of the cover 104 and/or the cylindrical feed tube 107, cylindrical food pusher 106 and cap 106a with the following discussion of their operation in a cleaning operation in conjunction with the foregoing cleaning feature assembly 215. Normally, during a juicing operation the food pusher 106 is removed from the hollow cylindrical inner portion of the feed tube 107. After food is inserted into the feed tube 107, the juicing appliance 100 is energized and the food pusher 106 is re-inserted into the feed tube 107 to push food within the feed tube 107 into the perforated surface 116a of the sieve 116 macerating the food. In this position, further illustrated in FIG. 9 and shown also in FIG. 3, a first indicia 106b is disposed on an upper rim of the pusher tube 106 and is in vertical alignment with the actuating member 220. In this position, the upper rim of the pusher tube 106 cannot contact an upper end of the actuating member 220 when the pusher tube 106 is fully seated in the feed tube 107 and the cleaning feature 215 (best understood as shown in FIG. 7) is inoperable.

When is desired to perform a cleaning operation of the sieve 116, the food pusher 106 is removed from the feed tube 107. The cap 106a on the upper open end of the food pusher 106 is removed. A cleaning fluid such as water is poured into a hollow interior of the food pusher 106 and the cap 106a is replaced when filled. There is a small aperture (not shown) at the bottom of the food pusher 106 and valve 106e disposed therein which is normally biased closed via a biasing member such as a spring (not shown) to prevent water from discharging from within the hollow interior of the food pusher 106. The food pusher 106 is re-inserted into the feed tube 107 but rotated one-hundred eight degrees (180°) from the normal position. In this position, further illustrated in FIG. 10 and shown also in FIG. 4, a second indicia 106c and a tab 106d underneath are in vertical alignment with the actuating member 220. When it is desired to clean the sieve 116, the food pusher 106 is depressed such that the tab 106d contacts the actuating member 220 causing actuating member 220 to be depressed in the direction of arrow 400 (FIG. 6). This causes a pair of posts 221 extending downwardly from the actuating member 220 to urge a wiper blade assembly 225 downward into the sieve 116 and against the perforated surface 116a.

Figure 10:
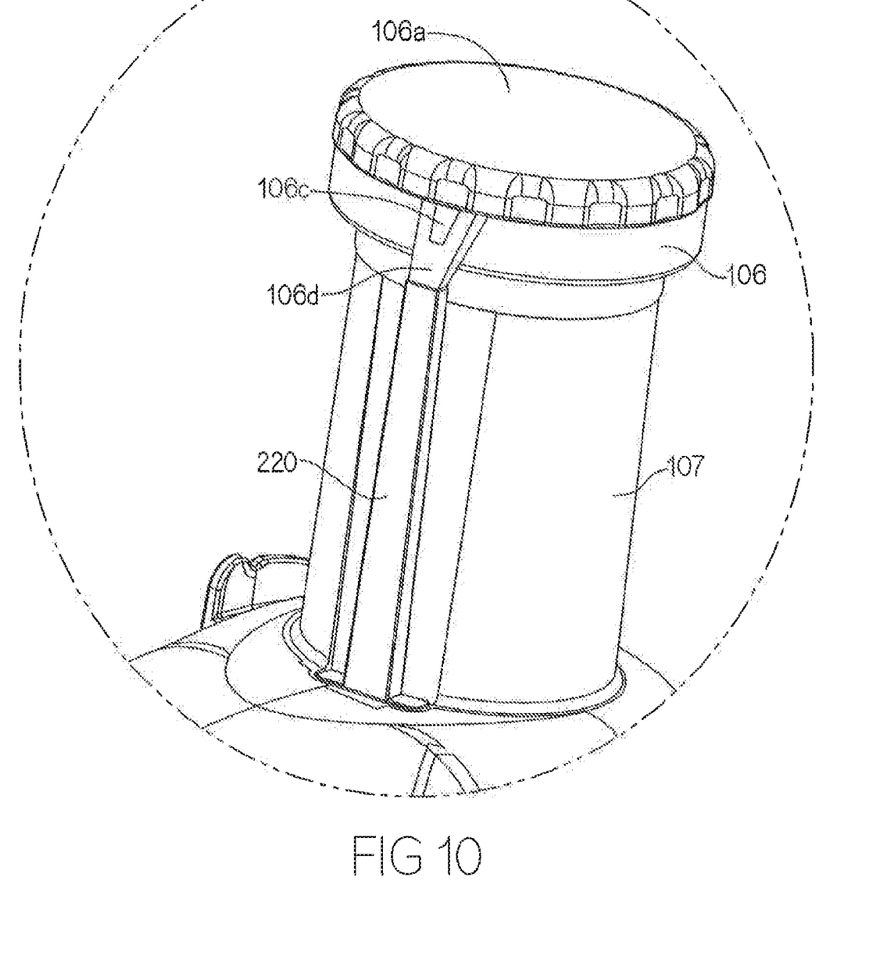
FIG. 10 is a rear perspective cutaway view of the feed tube shown in FIG. 8 with the food pusher in the first position for juicing operations and a first indicia indicating the first position.
Figure 11:
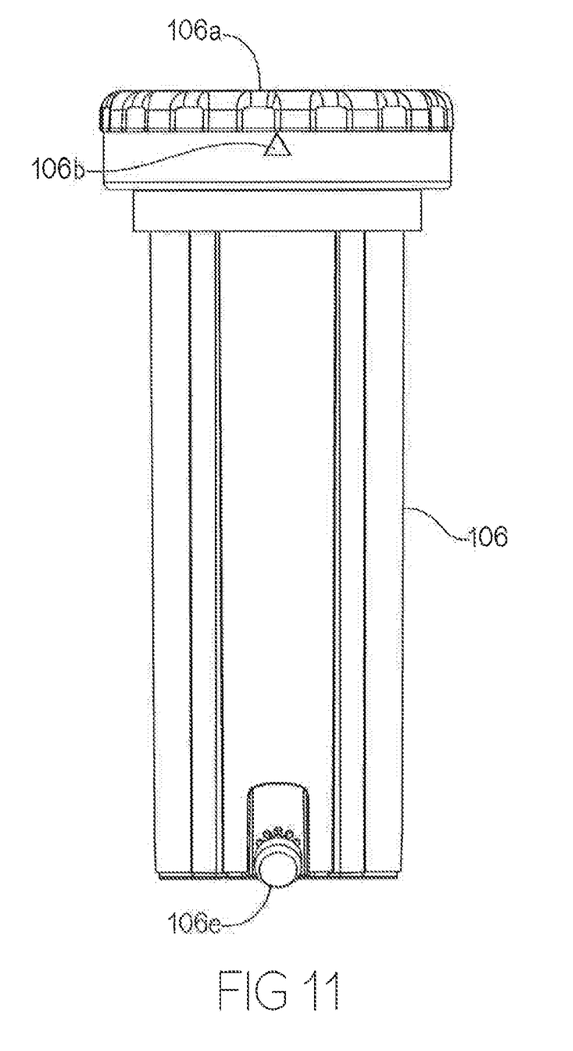
FIG. 11 is a rear view of the food pusher shown best in FIG. 2 and illustrating a valve for controlling the release of cleaning fluid during cleaning operations.
Figure 12:
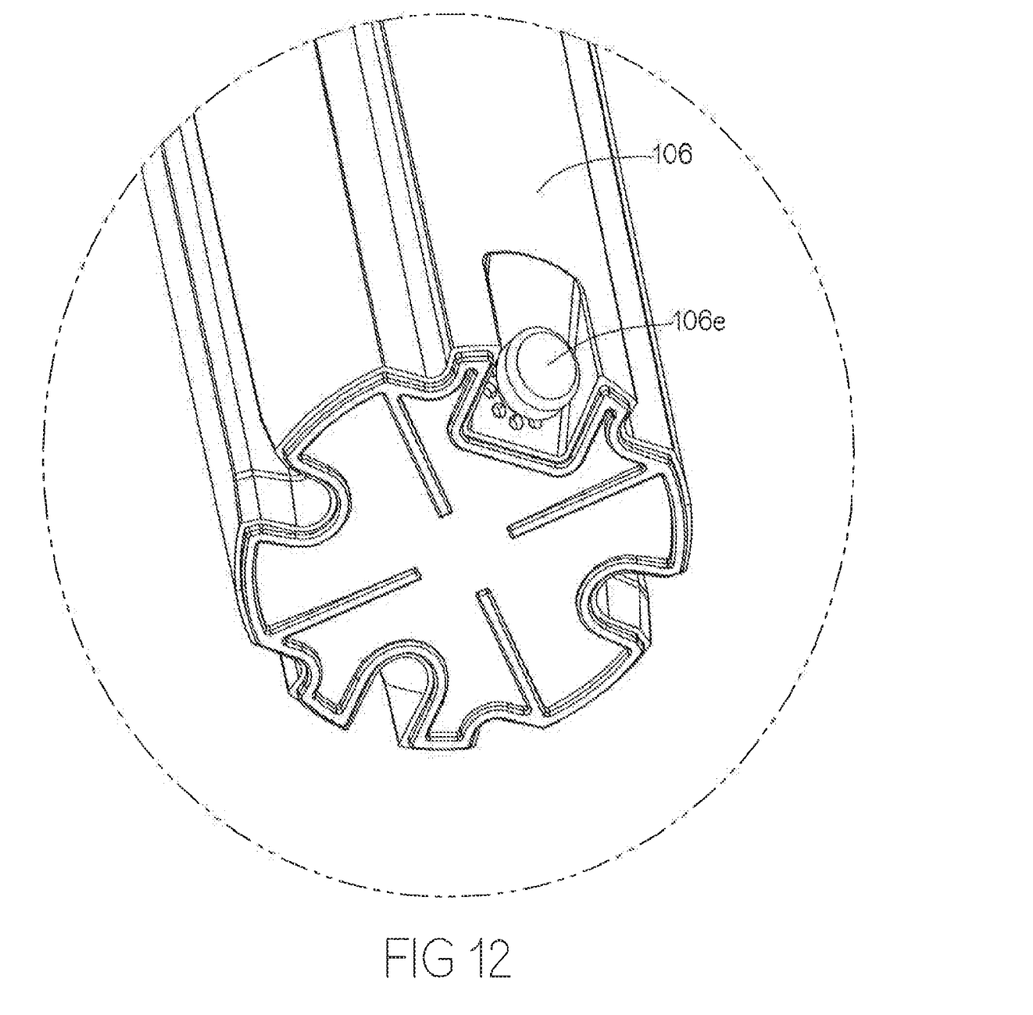
FIG. 12 is a perspective cutaway view of the food pusher illustrating up close the valve shown in FIG. 11.

At the same time, when the feed tube 107 is rotated one-hundred eighty degrees (180°) from the normal position as illustrated in FIGS. 10 and 4, the valve 106e at the bottom end of the food pusher 106 is urged against the bottom of the feed tube 107 which causes the valve 106e to open and water from within the interior of the food pusher 106 is discharged into the perforated surface 116a of the sieve 116 below for cleaning. The combination of the wiper blade assembly 225 being urged against the perforated surface 116a and the water being discharged onto the perforated surface 116a facilitates the cleaning and removal of built up food residue and pulp.

The volume of water in the interior of the food pusher 106 is selected for optimal cleaning based on the time it takes to discharge the water through the valve 106e. For example, it has been found experimentally that for approximately twenty seconds of water discharge eighty-one milliliters of water is need to be filled into the hollow interior of the food pusher 106. However, the amount time and the amount of water is not meant to be limiting as these parameters may vary based on preference, type of food being processed, size of sieve 116 or other factors not discussed herein.

In alternate embodiments, the wiper blade 230 may automatically be moved into position against the perforated surface 116a at periodic intervals by a solenoid (not shown) controlled by an electronic pushbutton (not shown) or a microprocessor (not shown).

Figure 9:
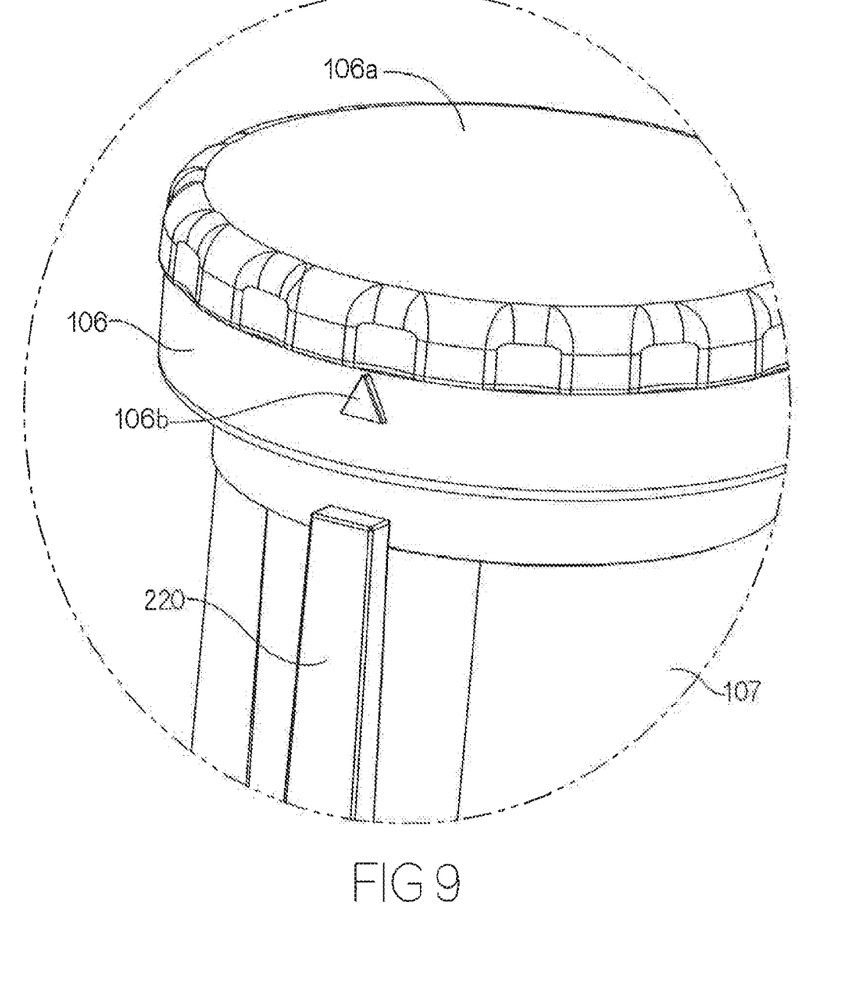
FIG. 9 is a front perspective cutaway view of the feed tube shown in FIG. 8 with the food pusher in the normal first position for juicing operations and a first indicia indicating the first position.

Upon completion of the cleaning operation, the food pusher 106 is removed from the feed tube 107, rotated one-hundred eighty-degrees (180°), and returned to the normal position as illustrated in FIG. 9. Another juicing operation may now be performed.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. An appliance, comprising:
   a sieve having an inner perforated surface for extracting a food item into liquid and solid particles;
   a source of power for rotating the sieve;
   a cleaning device for removing unwanted buildup of pulp from the perforated surface of the sieve, the cleaning device including a cleaning implement having a first position normally biased into a non-engaged position from the perforated surface and a second position when the cleaning device is operated to an engaged position against the perforated surface;
   wherein the cleaning implement is biased against the perforated surface in the second position using a biasing member configured to maintain constant engagement of the cleaning implement against the perforated surface while the sieve is rotated;
   a housing for holding the sieve;
   a lid fitted over the housing and having a hollow food inlet tube; and
   a food pusher positioned and located at least partially within the food inlet tube, the food pusher including a valve located at a bottom position of the food pusher;
   wherein the food pusher is configured to push food items into the perforated surface of the sieve; and
   a reservoir holding a pre-determined volume of cleaning fluid that is released and directed onto the sieve when the cleaning device is operated, wherein the reservoir is an interior volume of the food pusher;
   wherein in the first position, the food pusher is inserted into the food inlet tube and the valve is biased closed; and
   wherein in the second position, the food pusher is rotated one-hundred eighty degrees and the food pusher is manually depressed to operate the cleaning device, and the valve at the bottom of the food pusher is open and able to release cleaning fluid from the reservoir onto the sieve for cleaning.

2. The appliance of claim 1, further including:
   the cleaning implement is a wiper blade.

3. The appliance of claim 2, further including the wiper blade is comprised of polytetrafluoroethylene.

4. The appliance of claim 1, wherein the biasing member is a coil wave spring.

5. The appliance of claim 1, the food pusher having a first visual indicia to indicate the food pusher is in the first position and a second visual indicia to indicate the food pusher is in the second position.

6. A food preparation appliance, comprising:
   a sieve having an inner perforated surface for extracting a food item into liquid and solid particles;
   a source of power for rotating the sieve;
   a manually operated cleaning device for removing unwanted buildup of pulp from the perforated surface of the sieve, the cleaning device including a cleaning implement having a first position normally biased into a non-engaged position from the perforated surface and a second position when the cleaning device is operated to an engaged position against the perforated surface;
   wherein the cleaning implement is biased against the perforated surface in the second position using a biasing member configured to maintain constant engagement of the cleaning implement against the perforated surface while the sieve is rotated; and a reservoir holding a pre-determined volume of cleaning fluid that is released and directed onto the sieve when the cleaning device is operated;

a housing for holding the sieve;

a lid fitted over the housing and having a hollow food inlet tube;

a food pusher positioned and located at least partially within the food inlet tube, the food pusher including a valve located at a bottom portion of the food pusher;

wherein the food pusher is configured to push food items into the perforated surface of the sieve;

wherein the reservoir is an interior volume of the food pusher;

wherein in the first position, the food pusher is inserted into the food inlet tube and the valve is biased closed; and wherein in the second position, the food pusher is rotated one-hundred eighty degrees and the food pusher is manually depressed to operate the cleaning device and cause the valve to open and release cleaning fluid from the reservoir and onto the sieve for cleaning.

7. The appliance of claim 6, wherein the cleaning implement is a wiper blade.

8. The appliance of claim 7, wherein the wiper blade is comprised of polytetrafluoroethylene.

9. The appliance of claim 6, wherein the biasing member is a coil wave spring.

10. The appliance of claim 6, the food pusher having a first visual indicia to indicate the food pusher is in the first position and a second visual indicia to indicate the food pusher is in the second position.

* * * * *